US009979791B2

(12) United States Patent
Aw et al.

(10) Patent No.: US 9,979,791 B2
(45) Date of Patent: May 22, 2018

(54) PHYSICAL SECURITY SYSTEM HAVING MULTIPLE SERVER NODES CONFIGURED TO IMPLEMENT A CONDITIONALLY TRIGGERED RULE

(71) Applicant: AVIGILON CORPORATION, Vancouver (CA)

(72) Inventors: Kevin Aw, Vancouver (CA); Kan Ru Chen, Vancouver (CA); Avery Chiang, Vancouver (CA); Tomer Goldenberg, Vancouver (CA); Jonathon Grieman, Vancouver (CA); Feng Pan, Vancouver (CA)

(73) Assignee: Avigilon Corporation, Vancouver (CA)

( * ) Notice: Subject to any disclaimer, the term of this patent is extended or adjusted under 35 U.S.C. 154(b) by 0 days. days.

(21) Appl. No.: 15/268,336

(22) Filed: Sep. 16, 2016

(65) Prior Publication Data
US 2017/0085648 A1    Mar. 23, 2017

Related U.S. Application Data

(60) Provisional application No. 62/220,834, filed on Sep. 18, 2015.

(51) Int. Cl.
| G08B 13/00 | (2006.01) |
| H04L 29/08 | (2006.01) |
| G08B 13/24 | (2006.01) |
| G08B 13/196 | (2006.01) |

(52) U.S. Cl.
CPC ........ *H04L 67/12* (2013.01); *G08B 13/19656* (2013.01); *G08B 13/2491* (2013.01); *G08B 13/19684* (2013.01)

(58) Field of Classification Search
None
See application file for complete search history.

(56) References Cited

U.S. PATENT DOCUMENTS

| 8,804,997 B2 | 8/2014 | Gagvani et al. | |
| 2013/0335219 A1* | 12/2013 | Malkowski | G08B 13/22 340/539.22 |
| 2014/0007230 A1 | 1/2014 | Jani et al. | |
| 2014/0074987 A1 | 3/2014 | Martz et al. | |
| 2014/0222892 A1 | 8/2014 | Lee et al. | |

(Continued)

OTHER PUBLICATIONS

International Search Report and Written Opinion dated Dec. 22, 2016, issued by the Canadian Intellectual Property Office in Patent Cooperation Treat Application No. PCT/CA2016/051092, filed Sep. 16, 2016.

*Primary Examiner* — Thomas McCormack
(74) *Attorney, Agent, or Firm* — Klarquist Sparkman, LLP

(57) ABSTRACT

A physical security system having multiple server nodes may be built as a distributed network. A first node of the system detects a trigger and a second node of the system detects an input signal that affects a condition to be satisfied prior to performing an action specified by the rule in response to the trigger. A condition evaluation node collects information permitting the condition to be evaluated, and when the condition is satisfied the system performs the action. The first, second, and condition evaluation nodes comprise part of a clustered system, and the condition evaluation node and the second node may be the same.

16 Claims, 7 Drawing Sheets

(56) References Cited

U.S. PATENT DOCUMENTS

2015/0254950 A1* 9/2015 Patterson ............... G08B 13/00
                                                    340/541
2016/0050262 A1* 2/2016 Kumar .................... H04L 67/10
                                                    709/204
2016/0352623 A1* 12/2016 Jayabalan ............... H04L 45/28

* cited by examiner

PHYSICAL SECURITY SYSTEM HAVING MULTIPLE SERVER NODES CONFIGURED TO IMPLEMENT A CONDITIONALLY TRIGGERED RULE

RELATED APPLICATIONS

This application claims the benefit of U.S. Provisional Patent Application No. 62/220,834, filed Sep. 18, 2015, which is hereby incorporated by reference in its entirety.

TECHNICAL FIELD

The present disclosure is directed at a physical security system that has multiple server nodes and that is configured to implement a conditionally triggered rule, and at related methods and techniques.

BACKGROUND

A physical security system is a system that implements measures to prevent unauthorized persons from gaining physical access to an asset, such as a building, a facility, or confidential information. Examples of physical security systems include surveillance systems, such as a system in which cameras are used to monitor the asset and those in proximity to it; access control systems, such as a system that uses RFID cards to control access to a building; intrusion detection systems, such as a home burglary alarm system; and combinations of the foregoing systems.

A physical security system often incorporates computers. As this type of physical security system gets larger, the computing power required to operate the system increases. For example, as the number of cameras in a surveillance system increases, the requisite amount of computing power also increases to allow additional video to be stored and to allow simultaneous use and management of a higher number of cameras. Research and development accordingly continue into overcoming problems encountered as a physical security system grows.

SUMMARY

According to a first aspect, there is provided a method for implementing a conditionally triggered rule on a physical security system having multiple server nodes. The method comprises detecting, at one of the server nodes ("first node"), a trigger for the rule; detecting, at another of the server nodes ("second node"), an input signal affecting a condition to be satisfied prior to performing an action specified by the rule in response to the trigger; collecting, at a single one of the server nodes ("condition evaluation node"), trigger information from the first node and condition information from the second node permitting the condition evaluation node to evaluate whether the condition is satisfied; evaluating, at the condition evaluation node, whether the condition is satisfied; and when the condition is satisfied, performing the action. Each of the first node, the second node, and the condition evaluation nodes comprise at least part of a server cluster and is each identified by a node identifier. The node identifier for each of the first node, the second node, and the condition evaluation node comprises at least part of cluster membership information identifying all and accessible by all of the servers in the server cluster.

According to another aspect, there is provided a method for implementing a conditionally triggered rule on a physical security system having multiple server nodes. The method comprises detecting, at a first node, a trigger for the rule; detecting, at a second node, an input signal affecting a condition to be satisfied prior to performing an action specified by the rule in response to the trigger; sending a request from the first node to a condition evaluation node to evaluate whether the condition is satisfied; evaluating, at the condition evaluation node, whether the condition is satisfied; sending a response indicating the condition is satisfied from the condition evaluation node to the first node when the condition is satisfied; and when the condition is satisfied, performing the action at the first node. Each of the first node, the second node, and the condition evaluation nodes comprise at least part of a server cluster and is each identified by a node identifier. The node identifier for each of the first node, the second node, and the condition evaluation node comprises at least part of cluster membership information identifying all and accessible by all of the servers in the server cluster.

According to another aspect, there is provided a physical security system comprising a first node and a second node. The first node is configured to detect a trigger for a conditionally triggered rule; send a request to the second node to evaluate a condition to be satisfied prior to performing an action specified by the rule in response to the trigger; and when the trigger has occurred and the first node has received a response to the request from the second node that the condition is satisfied, perform the action. The second node is configured to detect a digital input affecting a condition to be satisfied prior to performing an action specified by the rule in response to the trigger; evaluate whether the condition is satisfied in response to the request from the first node; and send the response to the first node, when the condition is satisfied. Each of the first node and the second node comprise at least part of a server cluster and is each identified by a node identifier. The node identifier for each of the first node and the second node comprises at least part of cluster membership information identifying all and accessible by all of the servers in the server cluster.

According to another aspect, there is provided a method for implementing a conditionally triggered rule on a physical security system having multiple server nodes. The method comprises detecting, at a first node, a trigger for the rule; detecting, at a second node, an input signal affecting a condition to be satisfied prior to performing an action specified by the rule in response to the trigger; sending a request from the first node to a single one of the server nodes ("rule evaluation node") to evaluate the rule; sending a request from the rule evaluation node to a condition evaluation node, which is not the rule evaluation node, to evaluate whether the condition is satisfied; evaluating, at the condition evaluation node, whether the condition is satisfied; sending a response indicating the condition is satisfied from the condition evaluation node to the rule evaluation node when the condition is satisfied; and when the condition is satisfied, performing the action. Each of the first node, the second node, and the condition evaluation nodes comprise at least part of a server cluster and is each identified by a node identifier. The node identifier for each of the first node, the second node, and the condition evaluation node comprises at least part of cluster membership information identifying all and accessible by all of the servers in the server cluster. The rule evaluation node may perform the action. Additionally or alternatively, the rule evaluation node may send a message to another of the servers in the cluster to perform all or part of the action.

The cluster membership information may be persistently stored on each of the first node, the second node, and the condition evaluation node.

The condition evaluation node may send to the first node a message regarding whether the condition is satisfied, and the first node may perform the action when the condition is satisfied.

The second node may be the condition evaluation node.

A device may be communicatively coupled to the second node and the second node may receive a binary digital input from the device that represents a state of the device. Evaluating whether the condition is satisfied may comprise evaluating whether the digital input is on or off at a particular time.

Additional devices may be communicatively coupled to the second node and the second node may receive from each of the additional devices a binary digital input that represents a state of the additional device from which the digital input originates. Evaluating whether the condition is satisfied may comprise evaluating whether at least two of the digital inputs are on or off at a particular time.

The particular time may be when the trigger is detected at the first node.

A single instance of an inter-server communication may be sent from the first node to the second node, the communication comprising a request that the second node evaluate the condition.

Collecting the trigger information and the condition information at the second node may comprise part of sending the inter-server communication.

The request may comprise an indication of whether the input signal is high or low, a timestamp, and an identifier of the device that generates the input signal.

The inter-server communication may comprise additional requests, from the first node to the second node, for the second node to evaluate the condition.

The inter-server communication may comprise a single remote procedure call.

The inter-server communication may comprise all requests generated by the first node for the second node within a period of time.

How many inter-server communications, each comprising a request that the second server evaluate a condition, that the second server is receiving from the server nodes may be determined; and when the second server is receiving more than a maximum permitted number of inter-server communications, it may refuse to fulfill the request of each of the inter-server communications exceeding the maximum permitted number.

The condition evaluation node may be a master server distinct from the first and second nodes.

According to another aspect, there is provided a physical security system configured to implement any of the foregoing aspects of the method and suitable combinations thereof.

According to another aspect, there is provided a non-transitory computer readable medium having encoded thereon computer program code that, when executed, causes a processor to perform any of the foregoing aspects of the method and suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Figure 1:
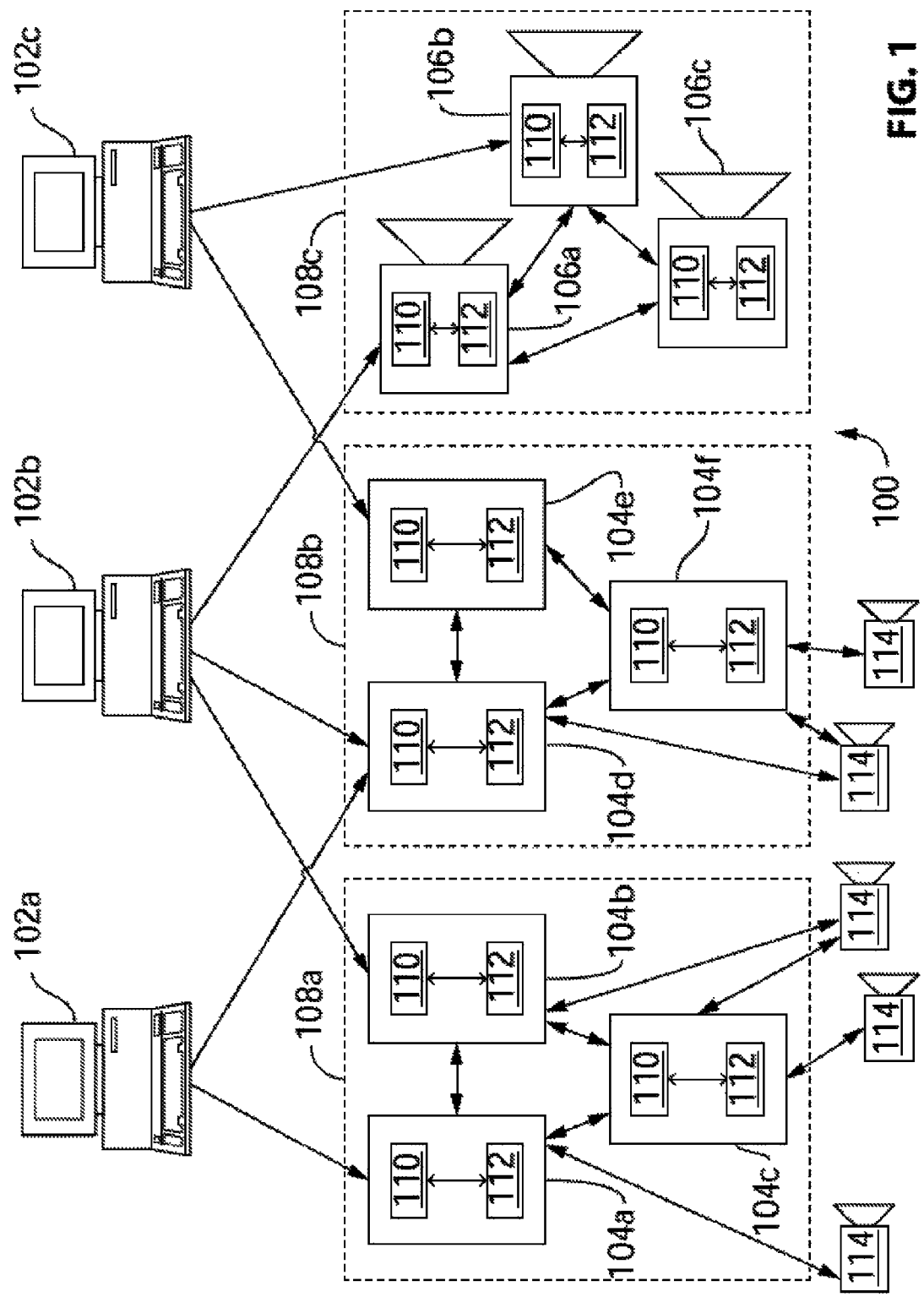
FIG. 1 is a block diagram of an example physical security system that has multiple server nodes and that is configured to implement a conditionally triggered rule, according to one embodiment.

A detailed description of one or more embodiments and aspects is provided below along with accompanying figures that illustrate the principles thereof. The scope is limited only by the claims and encompass numerous alternatives, modifications and equivalents. Numerous specific details are set forth in the following description in order to provide a thorough understanding. These details are provided for the purpose of example and the systems and methods described herein may be practiced according to the claims without some or all of these specific details. For the purpose of clarity, technical material that is known in the technical fields related to the invention has not been described in detail so that the invention is not unnecessarily obscured.

Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description is intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the system and method", unless expressly specified otherwise. A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" or "multiple" means "two or more", unless expressly specified otherwise. The term "herein" means "in the present application, including anything which may be incorporated by reference", unless expressly specified otherwise.

The term "e.g." and like terms mean "for example", and thus does not limit the term or phrase it explains.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. Section 1.72(b) or similar law in other jurisdictions. The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed aspect(s) are widely applicable to numerous embodiments, as is readily apparent from the disclosure. One of ordinary skill in the art will recognize that the disclosed aspect(s) may be practiced with various modifications and alterations, such as structural and logical modifications. Although particular features of the disclosed aspect(s) may be described with reference to one or more particular embodiments and/or drawings, it should be understood that such features are not limited to usage in the one or more particular embodiments or drawings with reference to which they are described, unless expressly specified otherwise.

No embodiment of method steps or system elements described in the present application is essential or is coextensive, except where it is either expressly stated to be so in this specification or expressly recited in a claim.

Once a surveillance system grows to include a certain number of cameras, it becomes impractical or impossible to operate the surveillance system using a single server because of storage capacity and processing power limitations. Accordingly, to accommodate the increased number of cameras, additional servers are added to the system. This results in a number of problems.

For example, one or more of the servers may be configured to perform an action following evaluation of a rule so long as a condition somewhere in the system is satisfied, with the evaluation being undertaken in response to detection of a trigger that occurs somewhere in the system. As used herein, a "trigger" refers to an event that occurs at one or more of the servers, that is detected by one or more of the servers; a "condition" refers to a state of one or more devices, such as a camera or a video encoder (to which one or more cameras may be communicatively coupled), communicatively coupled to one or more of the servers; and a "rule" that is associated with a particular trigger and condition and refers to a method performed by one or more of the servers in response to that trigger occurring when that condition is satisfied, with performance of the rule resulting in performance of one or more actions.

Example triggers for an example surveillance system comprise: a server in the system has lost contact with a device that is the source of a digital input, the server has regained contact with a device that is the source of a digital input, a failover has started, a failover has stopped, an upgrade of a device has started, an upgrade of a device has failed, an upgrade of a device has successfully completed, a device such as a camera has detected the start of motion, a device such as a camera has detected the end of motion, a device such as a camera has started recording, a device such as a camera has had its recording interrupted, a device such as a camera has had its recording resumed, a digital input from a device has been activated, a digital input from a device has been deactivated, a license has expired, a license is determined to imminently expire, a server has shutdown normally, a server has shutdown abnormally, a server has started, a database has been recovered, an email error has occurred, a hardware error has occurred, a device or server has low resources, a network has been removed, a network has been added, a backup has started, a backup has ended, a backup has failed, a form of storage such as a backup drive has returned an initialization error, a form of storage is low on disk space, an error has occurred while writing to storage, an upgrade to storage has started, an upgrade to storage has successfully completed, an upgrade to storage has failed, a recovery of storage has started, a recovery of storage has successfully completed, a recovery of storage has failed, a storage volume has failed, a storage volume has been restored, an attempt to save a storage bookmark has failed, an external plugin to a device has sent a sent a signal, packets have been lost, packets have been recovered, recording has started, recording has ended, a license plate has been identified and matched, a license plate is in sight of a camera's field of view, a license plate has left the camera's field of view, an alarm has been triggered, an alarm has been acknowledged, an alarm acknowledgement has been denied, an alarm acknowledgement has been granted, an alarm has been automatically acknowledged, an alarm has been assigned, an alarm has been purged, an alarm has been unassigned, a text transact/point of sale transaction has started, a text transact/point of sale transaction has ended, a text transact/point of sale watch item has been matched, a user has logged in, a user has logged out, a device has been connected, a device has been disconnected, a pan-tilt-zoom ("PTZ") camera has been activated, a PTZ camera is idle, a user has changed a server setting, a user has changed a site/cluster setting, a user has changed a device setting, a user has added a bookmark, a user has updated a bookmark, a user has deleted a bookmark, user data has been exported, a user has connected a device, a user has disconnected a device, a user has triggered a digital output, a user has activated a speaker, a user has deactivated a speaker, a user has opened multiple video feeds simultaneously displaying video on a monitor, a user has created a map, a user has modified a map, a user has deleted a map, a user has created a weblink, a user has modified a weblink, a user has deleted a weblink, a user has created a saved view, a user has modified a saved view, a user has deleted a saved view, a user has modified a site view, a connection with a server has been lost, a user macro has been triggered, analytics have been started, analytics have ended, and tampering has been detected.

Example conditions comprise whether: a device is currently experiencing a failover, a device is currently detecting motion, a device is not recording as a result of an interruption, a device is again recording after having resumed from a recording interruption, a digital input is activated, a backup is occurring, a storage upgrade is occurring, storage recovery is occurring, a device is recording (regardless of whether that recording has been interrupted), a text transact/point of sale transaction is occurring, a speaker is activated, and analytics are currently being performed.

In some embodiments, a condition of a device is related to triggers sent by that device. For example, if a device is a camera and the camera emits a binary digital signal that transitions from low to high when video recording begins and from high to low when video recording ends, whether the camera is currently recording is a condition, or state, of that camera, with changes in the condition identified by the transitions of the digital signal from high to low or low to high.

Example actions comprise: restarting a service, sending an e-mail, beginning recording using a device, sending a message to a user, opening a live video stream, rebooting a device, moving a PTZ camera to a preset position, implementing a run pattern using a PTZ camera, triggering an alarm, acknowledging an alarm, playing a sound, triggering a digital output, creating a bookmark, opening a view, opening a live video stream, opening a map, opening a website, and sending a notification external of the system 100.

In one example of a surveillance system that has multiple server nodes and that implements conditional rules, the server at which the trigger occurs or is detected is responsible for evaluating the rule and performing any action specified by the rule, and consequently may require access to the condition of a device connected to another of the servers. In some of the example embodiments described herein, the servers share one or both of trigger and condition information between themselves on a peer-to-peer basis so that the server whose responsibility it is to evaluate the rule and perform any action has the trigger and condition information required to accurately determine how to evaluate the rule and whether to perform the action. In some example embodiments, the server that detects the trigger is also the server that evaluates the rule and performs the action, and consequently that server receives the condition information from one or more other servers. In some other example embodiments, the server that has some or all of the condition information receives the trigger information from one or more of the other servers. In still other example embodiments, the server that evaluates the rule and performs the action is different from one or more servers that detect the trigger and the one or more servers that have the condition information, and consequently receives the trigger and condition information from those one or more other servers.

Regardless, the embodiments below disclose a physical surveillance system in which one or both of trigger and condition information may be shared in a peer-to-peer manner between server nodes of the system, and also disclose related methods and techniques. In this system, users connect via clients to server nodes, such as network video recorders, cameras, and servers. Server nodes are grouped together in clusters, with each server node in the cluster being able to share data, such as rules, trigger information, and condition information, with the other server nodes in the cluster. To share this data, each of the server nodes runs services that exchange data based on a protocol suite that shares data between the server nodes in different ways depending on the nature of the data being shared. FIGS. 1 to 7 depict these embodiments.

Referring now to FIG. 1, there is shown a distributed physical security system in the form of a surveillance system 100, according to one embodiment. The system 100 includes three clients 102a-c (first client 102a to third client 102c and collectively referred to as "clients 102"), six servers 104a-f (first server 104a to sixth server 104f and collectively referred to as "servers 104"), three server node cameras 106a-c (first node camera 106a to third node camera 106c and collectively referred to as "node cameras 106"), and five non-node cameras 114.

Each of the node cameras 106 and servers 104 includes a processor 110 and a memory 112 that are communicatively coupled to each other, with the memory 112 having encoded thereon computer program code to cause the processor 110 to perform any embodiments of the methods described herein when the processor 110 executes that code. The servers 104 and node cameras 106 are grouped into three clusters 108a-c (collectively referred to as "clusters 108"): the first through third servers 104a-c are communicatively coupled to each other to form a first cluster 108a; the fourth through sixth servers 104d-f are communicatively coupled to each other to form a second cluster 108b; and the three node cameras 106 are communicatively coupled to each other to form a third cluster 108c. The first through third servers 104a-c are referred to as "members" of the first cluster 108a; the fourth through sixth servers 104d-f are referred to as "members" of the second cluster 108b; and the first through third node cameras 106a-c are referred to as "members" of the third cluster 108c.

Each of the servers 104 and node cameras 106 is a "server node" in that each is aware of the presence of the other members of its cluster 108 and can send data to the other members of its cluster 108; in contrast, the non-node cameras 114 are not server nodes in that they are aware only of the servers 104a, b, c, d, f to which they are directly connected. In the depicted embodiment, the server nodes are aware of all of the other members of the cluster 108 by virtue of having access to cluster membership information, which lists all of the server nodes in the cluster 108. The cluster membership information is stored persistently and locally on each of the server nodes, which allows each of the server nodes to automatically rejoin its cluster 108 should it reboot during the system 100's operation. A reference hereinafter to a "node" is a reference to a "server node" unless otherwise indicated.

While in the depicted embodiment none of the clusters 108 participate in intercluster communication, in alternative embodiments (not shown) the members of various clusters 108 may share data with each other. In the depicted embodiment the servers 104 are commercial off-the-shelf servers and the cameras 106, 114 are manufactured by Avigilon™ Corporation of Vancouver, Canada; however, in alternative embodiments, other suitable types of servers 108 and cameras 106, 114 may be used.

The first client 102a is communicatively coupled to the first and second clusters 108a, b by virtue of being communicatively coupled to the first and fourth servers 104a, d, which are members of those clusters 108a, b; the second client 102b is communicatively coupled to all three clusters 108 by virtue of being communicatively coupled to the second and fourth servers 104b, d and the first node camera 106a, which are members of clusters 108; and the third client 102c is communicatively coupled to the second and third clusters 108b, c by virtue of being communicatively coupled to the fifth server 104e and the second node camera 106b, which are members of those clusters 108b, c. As discussed in more detail below, in any given one of the clusters 108a-c each of the nodes runs services that allow the nodes to communicate with each other according to a protocol suite 200 (shown in FIG. 2), which allows any one node to share data, whether that data be views, video, system events, user states, user settings, or another kind of data, to any other node using distributed computing; i.e., without using a centralized server. Each of the nodes has access to cluster membership information that identifies all the nodes that form part of the same cluster 108; by accessing this cluster membership information, data can be shared and synchronized between all the nodes of a cluster 108.

Figure 2:
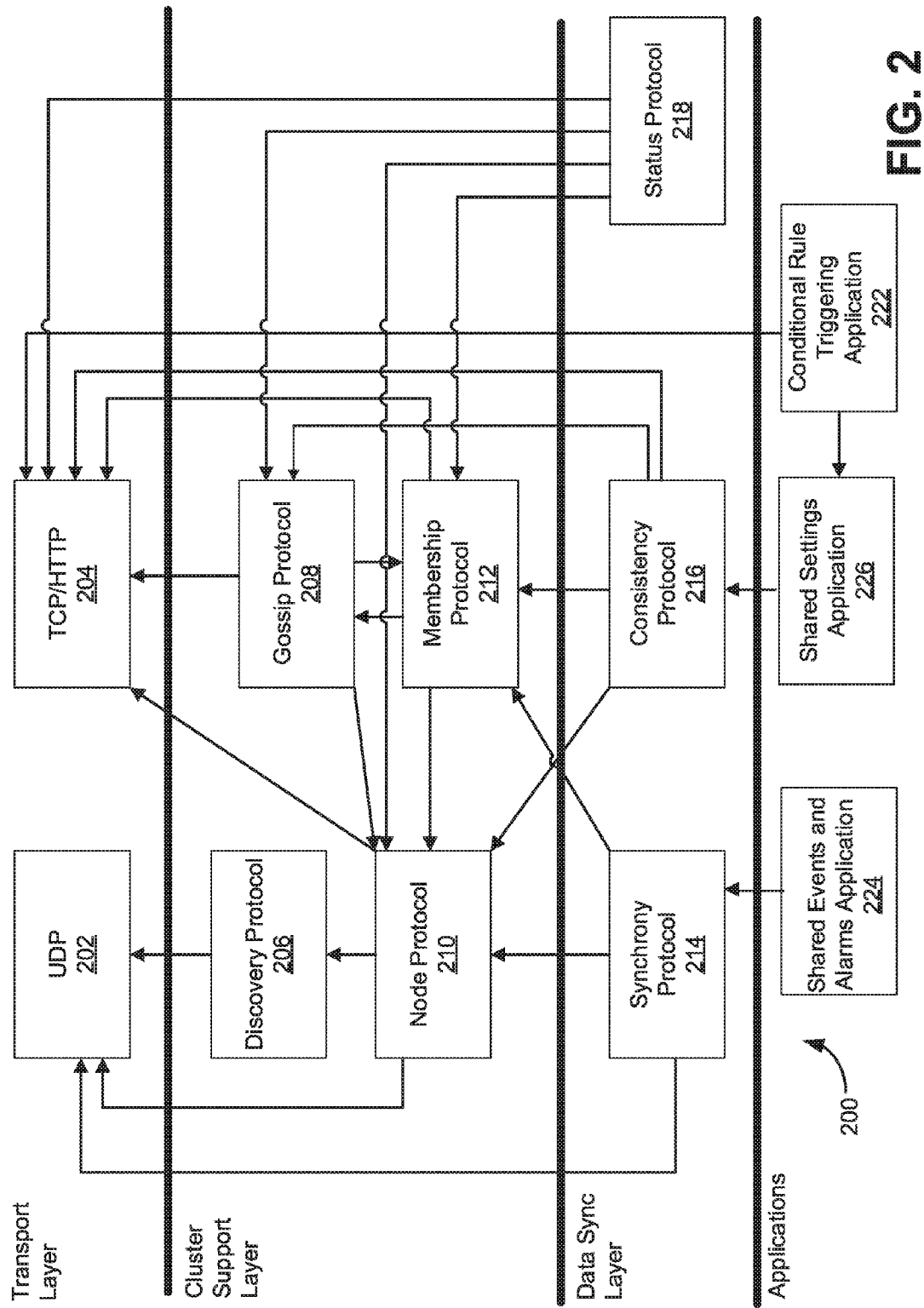
FIG. 2 is a block diagram of a protocol suite used by the system of FIG. 1.

FIG. 2 shows a block diagram of the protocol suite 200 employed by the nodes of the system 100. The protocol suite 200 is divided into three layers and includes the following protocols, as summarized in Table 1:

TABLE 1

Summary of the Protocol Suite 200

| Protocol Name | Protocol Layer | Receives Data from these Protocols and Applications | Sends Data to these Protocols |
|---|---|---|---|
| UDP 202 | Transport | Discovery Protocol 206, Node Protocol 210, Synchrony Protocol 214 | N/A |
| TCP/HTTP 204 | Transport | Node Protocol 210, Gossip Protocol 208, Membership Protocol 212, Consistency Protocol 216, Status Protocol 218, Conditional Rule Triggering Application 222 | N/A |
| Discovery Protocol 206 | Cluster Support | Node Protocol 210 | UDP 202 |
| Gossip Protocol 208 | Cluster Support | Membership Protocol 212, Consistency Protocol 216, Status Protocol 218 | TCP/HTTP 204, Node Protocol 210, Membership Protocol 212 |
| Node Protocol 210 | Cluster Support | Synchrony 214, Consistency Protocol 216, Membership Protocol 212, Status Protocol 218, Gossip Protocol 208 | UDP 202, TCP/HTTP 204, Discovery Protocol 206 |
| Membership Protocol 212 | Cluster Support | Synchrony Protocol 214, Gossip Protocol 208, Status Protocol 218, Consistency Protocol 216 | Gossip Protocol 208, Node Protocol 210, TCP/HTTP 204 |
| Synchrony Protocol 214 | Data Sync | Shared Events and Alarms Application 224 | UDP 202, Node Protocol 210, Membership Protocol 212 |
| Consistency Protocol 216 | Data Sync | Shared Settings Application 226 | Node Protocol 210, Membership Protocol 212, Gossip Protocol 208, TCP/HTTP 204 |
| Status Protocol 218 | Data Sync | N/A | Gossip Protocol 208, Membership Protocol 212, Node Protocol 210, TCP/HTTP 204 |

A description of the function and operation of each of the protocols in the protocol suite 200 follows.

Transport Layer

The Transport Layer corresponds to layer 4 of the Open Systems Interconnection (OSI) model, and is responsible for providing reliable data transfer services between nodes to the cluster support, data synchronization, and application layers. The Transport Layer in the system 100 includes the UDP 202 and TCP/HTTP 204 protocols.

Cluster Support Layer

The Cluster Support Layer includes the protocols used to discover nodes, verify node existence, check node liveliness, determine whether a node is a member of one of the clusters 108, and determine how to route data between nodes.

Discovery Protocol 206

The Discovery protocol 206 is based on version 1.1 of the WS-Discovery protocol published by the Organization for the Advancement of Structured Information Standards (OASIS), the entirety of which is hereby incorporated by reference herein. In the depicted embodiment, XML formatting used in the published standard is replaced with Google™ Protobuf encoding.

The Discovery protocol 206 allows any node in the system 100 to identify the other nodes in the system 100 by multicasting Probe messages to those other nodes and waiting for them to respond. A node may alternatively broadcast a Hello message when joining the system 100 to alert other nodes to its presence without requiring those other nodes to first multicast the Probe message. Both the Probe and Hello messages are modeled on the WS-Discovery protocol published by OASIS.

Gossip Protocol 208

The Gossip protocol 208 is an epidemic protocol that disseminates data from one of the nodes to all of the nodes of that cluster 108 by randomly performing data exchanges between pairs of nodes in the cluster 108. The Gossip protocol 208 communicates liveliness by exchanging "heartbeat state" data in the form of a heartbeat count for each node, which allows nodes to determine when one of the nodes in the cluster 108 has left unexpectedly (e.g.: due to a server crash). The Gossip protocol 208 also communicates "application state" data such as top-level hashes used by the Consistency protocol 216 and status entity identifiers and their version numbers used by the Status protocol 218 to determine when to synchronize data between the nodes, as discussed in more detail below. The data spread using the Gossip protocol 208 eventually spreads to all of the nodes in the cluster 108 via periodic node to node exchanges.

A data exchange between any two nodes of the cluster 108 using the Gossip protocol 208 involves performing two remote procedure calls (RPCs) from a first node ("Node A") to a second node ("Node B") in the same cluster 108, as follows:

1. Node A sends a GreetingReq message to Node B, which contains a list of digests for all the nodes in the cluster 108 of which Node A is aware. For each node, a digest includes a unique node identifier and version information that is incremented each time either the heartbeat state or application state for that node changes. The version information may be, for example, a one-dimensional version number or a multi-dimensional version vector. Using a version vector allows the digest to summarize the history of the state changes that the node has undergone.
2. Node B sends a GreetingRsp message to Node A, which contains:
   (a) a list of digests for nodes about which Node B wishes to receive more information from Node A, which Node B determines from the version information sent to it in the GreetingReq message;
   (b) a list of digests for nodes about which Node A does not know form part of the cluster 108;
   (c) a list of one or both of heartbeat and application states that will bring Node A up-to-date on nodes for which it has out-of-date information; and
   (d) a list of nodes that Node A believes form part of the cluster 108 but that Node B knows have been removed from the cluster 108.
3. Node A then sends a ClosureReq message to Node B, in which Node A sends:
   (a) a list of digests for nodes about which Node A wishes to receive more information from Node B (e.g. Node A may request information for nodes of which Node A was unaware until Node B sent Node A the GreetingRsp message);
   (b) a list of states that will bring Node B up-to-date on nodes for which it has out-of-date information; and
   (c) a list of nodes that Node B believes form part of the cluster 108 but that Node A knows have been removed from the cluster 108.
4. Node B then sends a ClosureRsp message to Node A, in which Node B sends:
   (a) a list of states that will bring Node A up-to-date on nodes it is out-of-date on, in response to Node A's request in ClosureReq; and
   (b) a list of nodes that have been removed from the cluster 108 since GreetingRsp.

After Nodes A and B exchange RPCs, they will have identical active node lists, which include the latest versions of the heartbeat state and application state for all the nodes in the cluster 108 that both knew about before the RPCs and that have not been removed from the cluster 108.

Node Protocol 210

The Node protocol 210 is responsible for generating a view of the system 100's network topology for each node, which provides each node with a network map permitting it to communicate with any other node in the system 100. In some embodiments, the network map is a routing table. The network map references communication endpoints, which are an address (IP/FQDN), port number, and protocol by which a node can be reached over the IP network that connects the nodes.

The Node protocol 210 does this in three ways:
1. via a "Poke exchange", as described in further detail below;
2. via the Discovery protocol 206, which notifies the Node protocol 210 when a node joins or leaves the system 100.
   When a node joins the system 100 a "Poke exchange" is performed with that node; and
3. manually, in response to user input.

A Poke exchange involves periodically performing the following RPCs for the purpose of generating network maps for the nodes:
1. a Poke request, in which Node A sends to Node B a Node A self view and a list of other nodes known to Node A, as viewed by Node A, following which Node B updates its network map in view of this information; and
2. a Poke response, in which Node B sends to Node A a Node B self view and a list of other nodes known to Node B, as viewed by Node B, following which Node A updates its network map in view of this information.

The RPCs are performed over the TCP/HTTP protocol 204.

To reduce bandwidth usage, node information is only exchanged between Nodes A and B if the node information has changed since the last time it has been exchanged.

A Poke exchange is performed after the Discovery protocol 206 notifies the Node protocol 210 that a node has joined the system 100 because the Discovery protocol 206 advertises a node's communication endpoints, but does not guarantee that the node is reachable using those communication endpoints. For example, the endpoints may not be usable because of a firewall. Performing a Poke exchange on a node identified using the Discovery protocol 206 confirms whether the communication endpoints are, in fact, usable.

The Node protocol 210 can also confirm whether an advertised UDP communication endpoint is reachable; however, the Node protocol 210 in the depicted embodiment does not perform a Poke exchange over the UDP protocol 202.

For any given node in a cluster 108, a network map relates node identifiers to communication endpoints for each of the nodes in the same cluster 108. Accordingly, the other protocols in the protocol stack 200 that communicate with the Node protocol 210 can deliver messages to any other node in the cluster 108 just by using that node's node identifier.

Membership Protocol 212

The Membership protocol 212 is responsible for ensuring that each node of a cluster 108 maintains cluster membership information for all the nodes of the cluster 108, and to allow nodes to join and leave the cluster 108 via RPCs. Cluster membership information is shared between nodes of the cluster 108 using the Status protocol 218. Each node in the cluster 108 maintains its own version of the cluster membership information and learns from the Status protocol 218 the cluster membership information held by the other nodes in the cluster 108. As discussed in further detail below, the versions of cluster membership information held by two different nodes may not match because the version of cluster membership information stored on one node and that has been recently updated may not yet have been synchronized with the other members of the cluster 108.

For each node, the cluster membership information includes:
1. A membership list of all the nodes of the cluster 108, in which each of the nodes is represented by:
   (a) the node identifier, which is unique among all the nodes in the system 100;
   (b) the node's state, which is any one of:
      (i) Discover: the node is a member of the cluster 108 but has not been synchronized with the other members of the cluster 108 since having booted;
      (ii) Joining: the node is in the process of joining a cluster 108;

(iii) Syncing: the node is in the process of synchronizing data using the Synchrony, Consistency, and Status protocols 214, 216, 218 with the cluster 108 it has just joined;

(iv) Valid: the node has completed synchronizing the cluster membership information and is a valid node of the cluster 108; and (v) TimedOut: the node has become unresponsive and is no longer an active member of the cluster 108 (the node remains a member of the cluster 108 until removed by a user);

(c) a session token;

(d) the version number of the cluster membership information when the node joined the cluster 108; and (e) the version number of the cluster membership information the last time it was changed.

2. A gravestone list listing all the nodes that have been removed from the cluster 108, in which each removed node is represented by:

(a) that node's node identifier; and (b) the version of that node's cluster membership information when the node was removed.

In the depicted embodiment, a node is always a member of a cluster 108 that comprises at least itself; a cluster 108 of one node is referred to as a "singleton cluster". Furthermore, while in the depicted embodiment the membership information includes the membership list and gravestone list as described above, in alternative embodiments (not depicted) the membership information may be comprised differently; for example, in one such alternative embodiment the membership information lacks a gravestone list, while in another such embodiment the node's state may be described differently than described above.

When Node A wants to act as a new server node and wants to join a cluster 108 that includes Node B, it communicates with Node B and the following occurs:

1. Node A sends a cluster secret to Node B, which in the depicted embodiment is a key that Node B requires before letting another node join its cluster 108. One of the clients 102 provides the cluster secret to Node A. As Node B controls Node A's access to the cluster 108, Node B acts as a "membership control node".

2. Nodes A and B exchange their membership information. The versions of the membership information on Nodes A and B are updated to include the node identifiers of Node A and of all the nodes of the cluster 108 that Node A is joining.

3. Node A's state is changed to "Joining" as Node A joins the cluster.

4. Once joined, Node A's state is changed to "Syncing" as data is exchanged between Node A and the cluster 108 it has just joined. Node B also updates the version of the membership information stored on the all the other nodes of the cluster 108 using the Status protocol 218. The process of updating the versions of the membership information stored on Node A and all the members of the cluster 108 that Node A is joining is referred to as "synchronizing" the versions of the membership information stored on all of these nodes.

5. After synchronization is complete, Node A's state changes to Valid.

Data Synchronization Layer

The Data Synchronization Layer includes the protocols that enable data to be sent between the nodes in a cluster with different ordering guarantees and performance tradeoffs. The protocols in the Data Synchronization Layer directly use protocols in the Transport and Cluster Support Layers.

Synchrony Protocol 214

The Synchrony protocol 214 is used to send data in the form of messages from Node A to Node B in the system 100 such that the messages arrive at Node B in an order that Node A can control, such as the order in which Node A sends the messages. Services that transfer data using the Synchrony protocol 214 run on dedicated high priority I/O service threads.

In the depicted embodiment, the Synchrony protocol 214 is based on an implementation of virtual synchrony known as the Totem protocol, as described in Agarwal D A, Moser L E, Melliar-Smith P M, Budhia R K, "The Totem Multiple-Ring Ordering and Topology Maintenance Protocol", ACM Transactions on Computer Systems, 1998, pp. 93-132, the entirety of which is hereby incorporated by reference herein. In the Synchrony protocol 214, nodes are grouped together into groups referred to hereinafter in this description as "Synchrony rings", and a node on any Synchrony ring can send totally ordered messages to the other nodes on the same ring. The Synchrony protocol 214 modifies the Totem protocol as follows:

1. The Synchrony protocol 214 uses both a service identifier and a ring identifier to identify a Synchrony ring. The service identifier identifies all instances of a given Synchrony ring, whereas the ring identifier identifies a particular instance of a given Synchrony ring. For example, each time a node joins or leaves a Synchrony ring that ring's ring identifier will change, but not its service identifier. The service identifier allows a node to multicast totally ordered messages to the group of nodes that share the same service identifier (i.e. the group of nodes that belong to the same Synchrony ring).

2. In the Totem protocol, in some cases when the nodes are not sending messages the Synchrony ring seen by nodes does not reflect the final ring configuration that converges when the nodes begin messaging. The Synchrony protocol 214 allows nodes to send probe messages to each other to cause Synchrony rings to converge prior to the sending of non-probe messages.

3. The Totem protocol only allows ordered messages to be sent to all nodes that form part of a Synchrony ring. In contrast, the Synchrony protocol 214 uses a Dispatch module that abstracts the network layer from the Synchrony protocol 214 by providing an interface to broadcast to all reachable nodes in the system 100; unicast to each of multiple nodes in the system 100 using a list of destination node identifiers; and to unicast to a single node in the system 100 using its node identifier. The Dispatch module also supports multiplexing of services on the same IP port using message filtering and routing by service identifier. Outgoing messages from a node are sent to the subset of nodes having the same service identifier unless multicast.

4. The Synchrony protocol 214 uses fragmented messages and user payload chunking and coalescing to address problems arising from the maximum transmission unit size of approximately 1,500 bytes.

5. The Synchrony protocol 214 modifies the way nodes use Join messages, which are messages nodes use in the Totem protocol to join a Synchrony ring:

(a) Join messages are sent by nodes only if they have the lowest node identifier in the current set of operational nodes in the Synchrony ring.

(b) Nodes that do not have the lowest node identifier in their operational set unicast Join messages to the nodes with the lowest node identifier in their operational set.

(c) Join messages include the service identifier, and nodes that are not part of the corresponding Synchrony ring do not respond.

Relative to the Totem protocol, these modifications help reduce aggregate bandwidth used by nodes to join Synchrony rings.

6. The Synchrony protocol 214 detects and blacklists nodes that are unable to join a Synchrony ring due to some types of network misconfigurations. For example, a node that is able to send to, but not receive messages from, the other nodes will appear to the other nodes to only ever send probe messages since all other messages in the present embodiment are solicited, and accordingly will be blacklisted.

7. The Synchrony protocol 214 performs payload encryption and authenticity verification of messages.

8. The Synchrony protocol 214 limits the time each node can hold the token used in the Totem protocol; in the depicted embodiment, each node can hold the token for 15 ms.

9. The Synchrony protocol 214 implements a TCP friendly congestion avoidance algorithm.

As discussed in more detail below, the system 100 uses the Synchrony protocol for the Shared Events and Alarms application 224; the data shared between members of a cluster 108 in these applications 222 is non-persistent and is beneficially shared quickly and in a known order.

Consistency Protocol 216

The Consistency protocol 216 is used to automatically and periodically share data across all the nodes of a cluster 108 so that the data that is shared using the Consistency protocol 216 is eventually synchronized on all the nodes in the cluster 108. The types of data that are shared using the Consistency protocol 216 are discussed in more detail below in the section discussing the Shared Settings application 226. Data shared by the Consistency protocol 216 is stored in a database on each of the nodes, and each entry in the database includes a key-value pair in which the key uniquely identifies the value and the keys are independent from each other. The Consistency protocol 216 synchronizes data across the nodes while resolving parallel modifications that different nodes may perform on different databases. As discussed in further detail below, the Consistency protocol 216 accomplishes this by first being notified that the databases are not synchronized; second, finding out which particular database entries are not synchronized; and third, finding out what version of the entry is most recent, synchronized, and kept.

In order to resolve parallel modifications that determine when changes are made to databases, each node that joins a cluster 108 is assigned a causality versioning mechanism used to record when that node makes changes to data and to determine whether changes were made before or after changes to the same data made by other nodes in the cluster 108. In the present embodiment, each of the nodes uses an interval tree clock (ITC) as a causality versioning mechanism. However, in alternative embodiments other versioning mechanisms such as vector clocks and version vectors can be used. The system 100 also implements a universal time clock (UTC), which is synchronized between different nodes using Network Time Protocol, to determine the order in which changes are made when the ITCs for two or more nodes are identical. ITCs are described in more detail in P. Almeida, C. Baquero, and V. Fonte, "Interval tree clocks: a logical clock for dynamic systems", *Princi. Distri. Sys.,* *Lecture Notes in Comp. Sci.*, vol. 5401, pp. 259-274, 2008, the entirety of which is hereby incorporated by reference herein.

The directory that the Consistency protocol 216 synchronizes between nodes is divided into branches, each of which is referred to as an Eventual Consistency Domain (ECD). The Consistency protocol 216 synchronizes each of the ECDs independently from the other ECDs. Each database entry within an ECD is referred to as an Eventual Consistency Entry (ECE). Each ECE includes a key; a timestamp from an ITC and from the UTC, which are both updated whenever the ECE is modified; a hash value of the ECE generating using, for example, a Murmurhash function; the data itself; and a gravestone that is added if and when the ECE is deleted.

The hash value is used to compare corresponding ECDs and ECEs on two different nodes to determine if they are identical. When two corresponding ECDs are compared, "top-level" hashes for those ECDs are compared. A top-level hash for an ECD on a given node is generated by hashing all of the ECEs within that ECD. If the top-level hashes match, then the ECDs are identical; otherwise, the Consistency protocol 216 determines that the ECDs differ. To determine which particular ECEs in the ECDs differ, hashes are taken of successively decreasing ranges of the ECEs on both of the nodes. The intervals over which the hashes are taken eventually shrinks enough that the ECEs that differ between the two nodes are isolated and identified. A bi-directional skip-list can be used, for example, to determine and compare the hash values of ECD intervals.

Two nodes that communicate using the Consistency protocol 216 may use the following RPCs:

1. SetEntries: SetEntries transmits new or updated ECEs to a node, which inserts them into the appropriate ECDs.
2. GetEntries: GetEntries transmits a key or a range of keys to a node, which returns the ECEs corresponding to those one or more keys.
3. SynEntries: SynEntries transmits a key or a range of keys to a node, and the two nodes then compare hashes of successively decreasing ranges of ECEs to determine which ECEs differ between the two nodes, as described above. If the ECEs differ, the nodes merge their ECEs so that the same ECEs are stored on the nodes by comparing the ITC timestamps; if the ITC timestamps match, the nodes compare the UTC timestamps associated with the ECEs. These timestamps act as version information that allows the two nodes to adopt the ECEs that have been most recently modified, as indicated by those ECEs' version information.

When a node changes ECEs, that node typically calls SynEntries to inform the other nodes in the cluster 108 that the ECEs have been changed. If some of the nodes in the cluster 108 are unavailable (e.g.: they are offline), then the Gossip protocol 208 instead of SynEntries is used to communicate top-level hashes to the unavailable nodes once they return online. As alluded to in the section discussing the Gossip protocol 208 in the cluster 108 above, each of the nodes holds its top-level hash, which is spread to the other nodes along with a node identifier, version information, and heartbeat state using the Gossip protocol 208. When another node receives this hash, it compares the received top-level hash with its own top-level hash. If the top-level hashes are identical, the ECEs on both nodes match; otherwise, the ECEs differ.

If the ECEs differ, regardless of whether this is determined using SynEntries or the Gossip protocol 208, the node that runs SynEntries or that receives the top-level hash synchronizes the ECEs.

Status Protocol 218

As discussed above, the Gossip protocol 208 shares throughout the cluster 108 status entity identifiers and their version numbers ("status entity pair") for nodes in the cluster 108. Example status entity identifiers may, for example, represent different types of status data in the form of status entries such as how much storage the node has available; which devices (such as the non-node cameras 114) are connected to that node; which clients 102 are connected to that node; and cluster membership information. When one of the nodes receives this data via the Gossip protocol 208, it compares the version number of the status entity pair to the version number of the corresponding status entry it is storing locally. If the version numbers differ, the Status protocol 218 commences an RPC ("Sync RPC") with the node from which the status entity pair originates to update the corresponding status entry.

A status entry synchronized using the Status protocol 218 is uniquely identified by both a path and a node identifier. Unlike the data synchronized using the Consistency protocol 216, the node that the status entry describes is the only node that is allowed to modify the status entry or the status entity pair. Accordingly, and unlike the ECDs and ECEs synchronized using the Consistency protocol 216, the version of the status entry for Node A stored locally on Node A is always the most recent version of that status entry.

If Node A modifies multiple status entries simultaneously, the Status protocol 218 synchronizes all of the modified status entries together to Node B when Node B calls the Sync RPC. Accordingly, the simultaneously changed entries may be dependent on each other because they will be sent together to Node B for analysis. In contrast, each of the ECEs synchronized using the Consistency protocol 216 is synchronized independently from the other ECEs, so ECEs cannot be dependent on each other as Node B cannot rely on receiving entries in any particular order.

Applications

Each of the nodes in the system 100 runs services that implement the protocol suite 200 described above. While in the depicted embodiment one service is used for each of the protocols 202-218, in alternative embodiments (not depicted) greater or fewer services may be used to implement the protocol suite 200. Each of the nodes implements the protocol suite 200 itself; consequently, the system 100 is distributed and is less vulnerable to a failure of any single node, which is in contrast to conventional physical security systems that use a centralized server. For example, if one of the nodes fails in the system 100 ("failed node"), on each of the remaining nodes the service running the Status protocol 218 ("Status service") will determine that the failed node is offline by monitoring the failed node's heartbeat state and will communicate this failure to the service running the Node and Membership protocols 210, 212 on each of the other nodes ("Node service" and "Membership service", respectively). The services on each node implementing the Synchrony and Consistency protocols 214, 216 ("Synchrony service" and "Consistency service", respectively) will subsequently cease sharing data with the failed node until the failed node returns online and rejoins its cluster 108.

The following describes the various applications 222-226 that the system 100 can implement. The applications 222-226 can be implemented as various embodiments of the example method for sharing data. The method begins by having a first node in the system 100 access a node identifier identifying another node in the system 100. Both the first and second nodes are members of the same server cluster 108. The node identifier that the first node accesses is part of the cluster membership information that identifies all the members of the cluster 108. The cluster membership information is accessible by all the members of the cluster 108. In the depicted embodiments each of the members of the cluster 108 stores its own version of the cluster membership information persistently and locally; however, in alternative embodiments (not depicted), the cluster membership information may be stored one or both of remotely from the nodes and in a central location. After accessing the node identifier for the second node, the first node sends the data to the second node, following which the method ends. For example, when using the Node service described above, the Synchrony and Consistency services running on the first node are able to send the data to the second node by using the second node's node identifier, and by delegating to the Node service responsibility for associating the second node's communication endpoint to its node identifier. Sending the data from the first node to the second node can comprise part of a bi-directional data exchange, such as when data is exchanged in accordance with the Gossip protocol 208.

Shared Settings Application 226

During the system 100's operation, persistently stored information is transferred between the nodes of a cluster 108. Examples of this real-time information that the shared settings application 226 share between the servers 104 are the conditional rules implemented by the servers 104; notwithstanding that only a single one of the servers 104 may be responsible for evaluating one of the rules and performing a resulting action, in one example embodiment the rules are propagated to and stored on all of the servers 104. This type of data ("Consistency data") is shared between nodes using the Consistency protocol 216; generally, Consistency data is data that does not have to be shared in real-time or in total ordering, and that is persistently stored by each of the nodes. However, in alternative embodiments (not depicted), Consistency data may be non-persistently stored.

Figure 3:
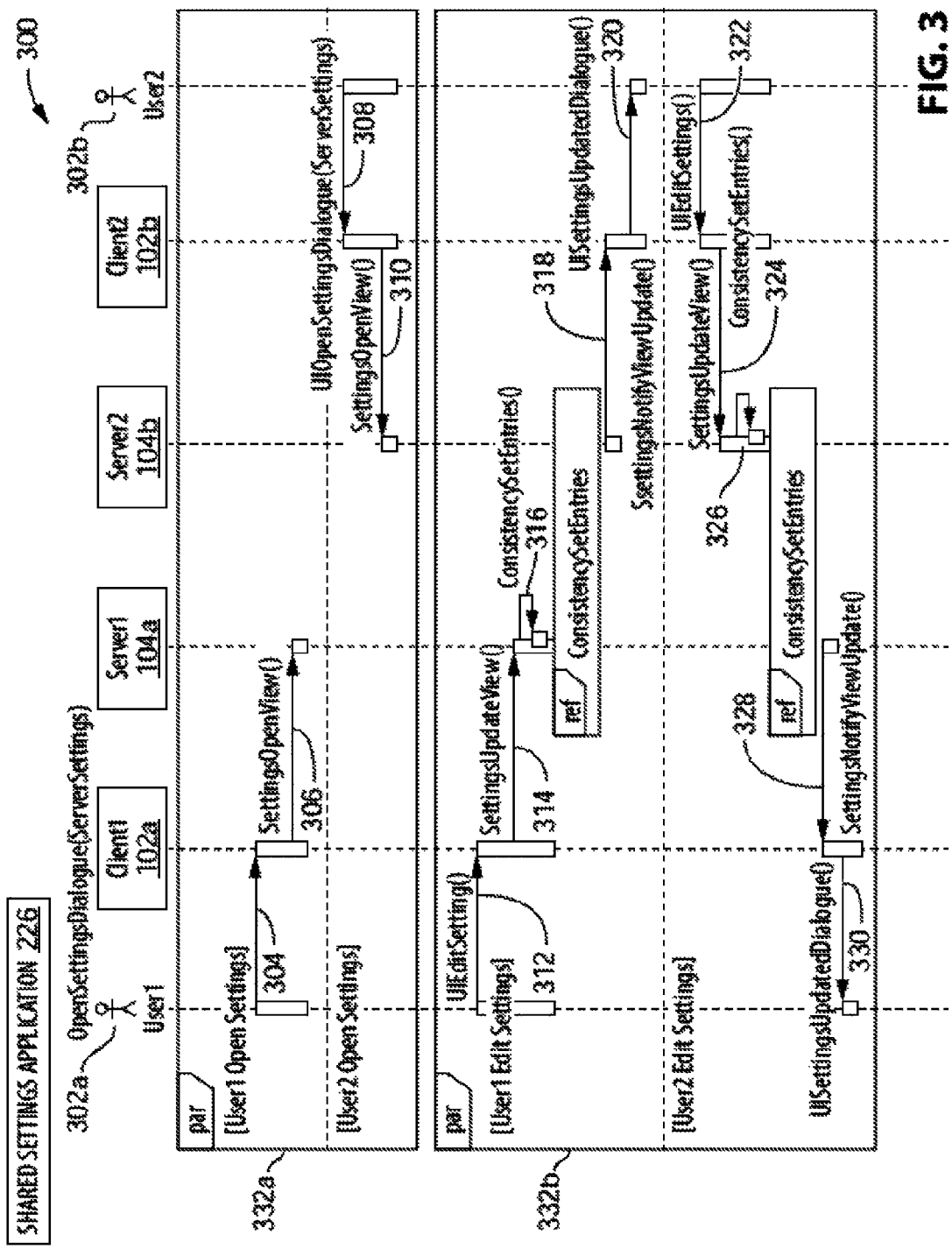
FIG. 3 is a UML sequence diagram showing how the system of FIG. 1 shares settings between different system users.

FIG. 3 shows a UML sequence diagram 300 in which Consistency data in the form of a user settings are shared between first and second users 302a,b (collectively, "users 302"). The users 302, the first and second clients 102a, b, and the first and second servers 104a, b, which are the first and second nodes in this example, are objects in the diagram 300. The servers 104a, b form part of the same cluster 108a. As the servers 104a, b with which the clients 102a, b communicate are not directly connected to each other, the Consistency protocol 216 is used to transfer data between the two servers 104a, b, and thus between the two users 302.

The diagram 300 has two frames 332a, b. In the first frame 332a, the first user 302a instructs the first client 102a to open a settings panel (message 304), and the client 102a subsequently performs the SettingsOpenView( )procedure (message 306), which transfers the settings to the first server 104a. Simultaneously, the second user 302b instructs the second client 102b analogously (messages 308 and 310). In the second frame 332b, the users 302 simultaneously edit their settings. The first user 302a edits his settings by having the first client 102a run UIEditSetting( )(message 312), following which the first client 102a updates the settings stored on the first server 104a by having the first server 104a run SettingsUpdateView( )(message 314). The first server 104a then runs ConsistencySetEntries( )(message 316), which performs the SetEntries procedure and which transfers the settings entered by the first user 302*a* to the second server 104*b*. The second server 104*b* then sends the transferred settings to the second client 102*b* by calling SettingsNotifyViewUpdate( )(message 318), following which the second client 102*b* updates the second user 302*b* (message 320). Simultaneously, the second user 302*b* analogously modifies settings and sends those settings to the first server 104*a* using the Consistency protocol 216 (messages 322, 324, 326, 328, and 330). Each of the servers 104*a, b* persistently stores the user settings so that they do not have to be resynchronized between the servers 104*a, b* should either of the servers 104*a, b* reboot. In the depicted example embodiment, the settings that the users 302 edit may permit the users 302 to define rules by defining which triggers will result in which actions, subject to certain conditions being satisfied, with each of the conditions comprising the state of a device 501 (not depicted in FIG. 3, but depicted in FIG. 5).

Shared Events and Alarms Application 224

During the system 100's operation, real-time information generated during runtime is transferred between the nodes of a cluster 108. Examples of this real-time information that the shared events and alarms application 224 shares between nodes are: alarm state (i.e. whether an alarm has been triggered anywhere in the system 100); system events such as motion having been detected; whether a device (such as one of the node cameras 106) is sending digital data to the rest of the system 100; whether a device (such as a motion detector) is connected to the system 100; whether a device is currently recording; whether an alarm has occurred or has been acknowledged by the users 302; whether one of the users 302 is performing an audit on the system 100; whether one of the servers 104 has suffered an error; whether a device connected to the system has suffered an error; whether a point-of-sale text transaction has occurred; and server node to client notifications such as whether settings/data having changed, current recording state, whether a timeline is being updated, and database query results. In the present embodiment, the data transferred between nodes using the Synchrony protocol 214 is referred to as "Synchrony data", is generated at run-time, and is not persistently saved by the nodes.

Figure 4:
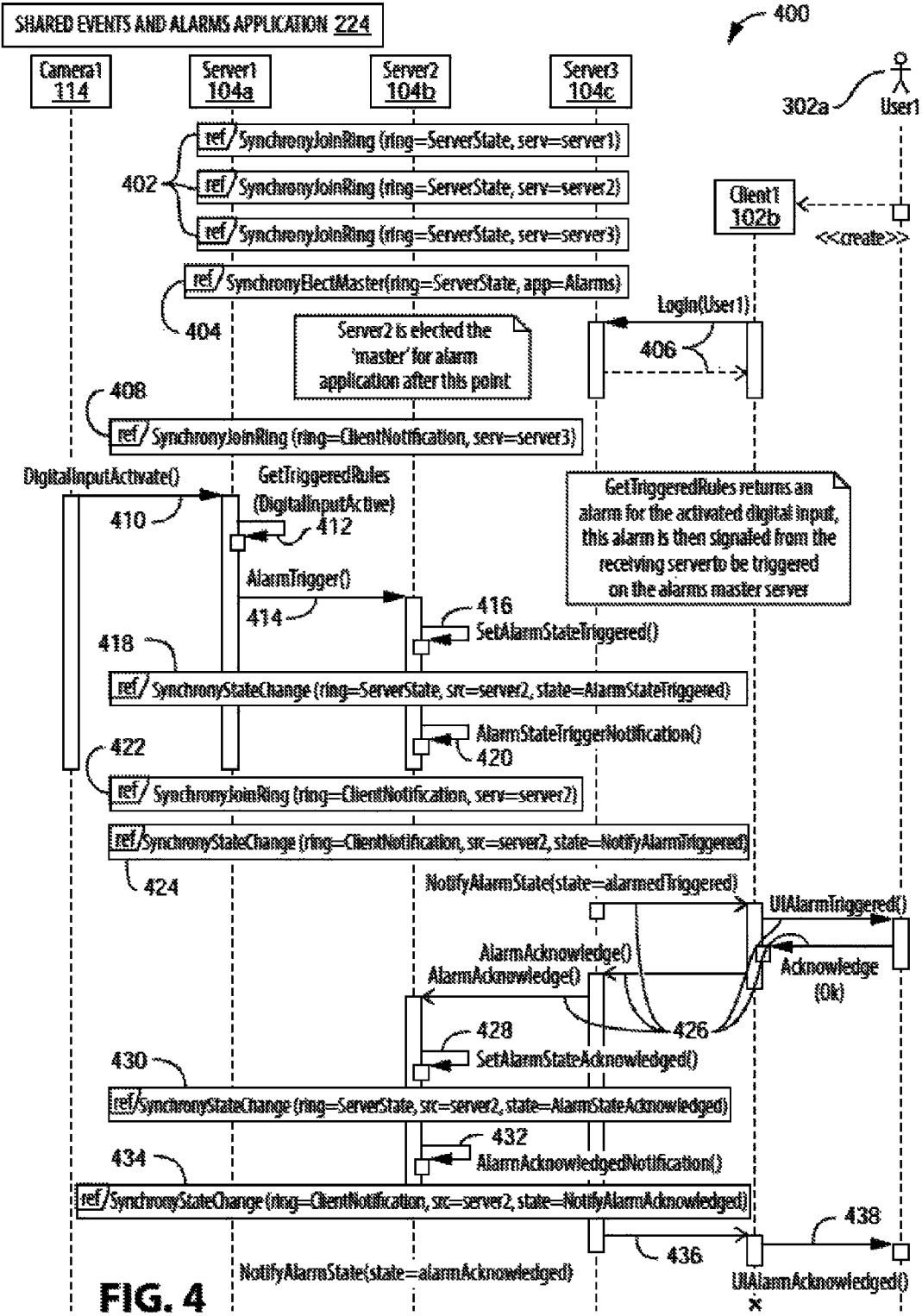
FIG. 4 is a UML sequence diagram showing how the system of FIG. 1 shares a state between different system users.

FIG. 4 shows a UML sequence diagram 400 in which an alarm notification is shared between the servers 104 using the Synchrony protocol 214. The objects in the diagram 400 are one of the non-node cameras 114, the three servers 104 in the first cluster 108*a*, and the second client 102*b*, which is connected to one of the servers 104*c* in the first cluster 108*a*.

At the first three frames 402 of the diagram 400, each of the servers 104 joins a Synchrony ring named "ServerState" so that the state of any one of the servers 104 can be communicated to any of the other servers 104; in the depicted embodiment, the state that will be communicated is "AlarmStateTriggered", which means that an alarm on one of the servers 108 has been triggered by virtue of an event that the non-node camera 114 has detected. At frame 404, the second server 104*b* is elected the "master" for the Alarms application; this means that it is the second server 104*b* that determines whether the input from the non-node camera 114 satisfies the criteria to transition to the AlarmStateTriggered state, and that sends to the other servers 104*a, c* in the Synchrony ring a message to transition them to the AlarmStateTriggered state as well.

The user 302*a* logs into the third server 104*c* (message 406) after the servers 104 join the ServerState Synchrony ring. Subsequent to the user 302*a* logging in, the third server 104*c* joins another Synchrony ring named "ClientNotification" (frame 408); as discussed in further detail below, this ring is used to communicate system states to the user 302*a*, whereas the ServerState Synchrony ring is used to communicate only between the servers 104. The non-node camera 114 sends a digital input, such as an indication that a door or window has been opened, to the first server 104*a* (message 410), following which the first server 104*a* checks to see whether this digital input satisfies a set of rules used to determine whether to trigger an alarm in the system 100 (message 412). In the depicted embodiment, the first server 104*a* determines that an alarm should be triggered, and accordingly calls AlarmTrigger( )(message 414), which alerts the second server 104*b* to change states. The second server 104*b* then transitions states to AlarmStateTriggered (message 416) and sends a message to the ServerState Synchrony ring that instructs the other two servers 104*a, c* to also change states to AlarmStateTriggered (frame 418). After instructing the other servers 104*a, c*, the second server 104*b* runs AlarmTriggerNotification( )(message 420), which causes the second server 104*b* to also join the ClientNotification Synchrony ring (frame 422) and pass a message to the ClientState Synchrony ring that causes the third server 104*c*, which is the other server on the ClientState Synchrony ring, to transition to a "NotifyAlarmTriggered" state (frame 424). Once the third server 104*c* changes to this state it directly informs the second client 102*b* that the alarm has been triggered, which relays this message to the user 302*a* and waits for the user 302*a* to acknowledge the alarm (messages 426). Once the user 302*a* acknowledges the alarm, the second server 104*b* accordingly changes states to "AlarmStateAcknowledged" (message 428), and then sends a message to the ServerState Synchrony ring so that the other two servers 104*a, c* correspondingly change state as well (frame 430). The second server 104*b* subsequently changes state again to "NotifyAlarmAcknowledged" (message 432) and sends a message to the third server 104*c* via the ClientNotification Synchrony ring to cause it to correspondingly change state (frame 434). The third server 104*c* then notifies the client 102*c* that the system 100 has acknowledged the alarm (message 436), which relays this message to the user 302*a* (message 438).

In an alternative embodiment (not depicted) in which the second server 104*b* fails and can no longer act as the master for the Synchrony ring, the system 100 automatically elects another of the servers 104 to act as the master for the ring. The master of the Synchrony ring is the only server 104 that is allowed to cause all of the other nodes on the ring to change state when the Synchrony ring is used to share alarm notifications among nodes.

Figure 6:
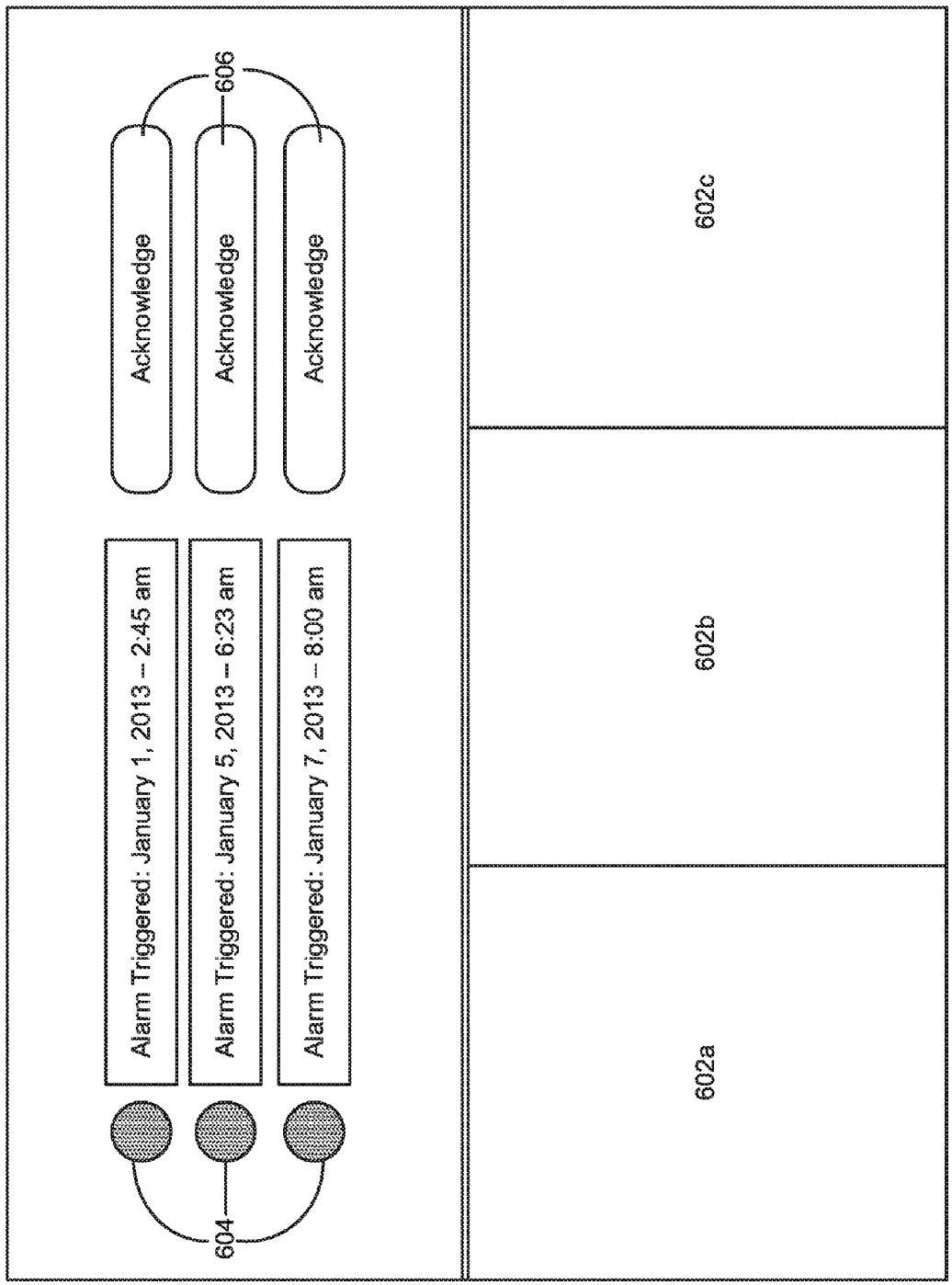
FIG. 6 is an example view seen by a user of the system of FIG. 1.

FIG. 6 shows an example view 600 presented to the users 302 when acknowledging an alarm state in accordance with the diagram 400 of FIG. 4. The view 600 includes video panels 602*a-c* (collectively "panels 602") showing real time streaming video from the non-node camera 114; alerts 604 indicating that an alarm has been triggered as a result of what the non-node camera 114 is recording; and an acknowledge button 606 that the second user 302*b* clicks in order to acknowledge the alarm having been triggered.

Conditional Rule Triggering Application 222

The diagram 400 of FIG. 4 depicts an example of a rule whose evaluation does not require condition information to be transferred between the servers 104. In FIG. 4, the first server 104*a* determines that a rule is to be performed whose performance comprises an action in the form of triggering an alarm in response to the presence of a digital input indicating, for example, that a door or window has been opened.

The first server 104a consequently calls AlarmTrigger( )(message 414), which causes the second server 104b to trigger the alarm. The diagram 400 does not indicate any condition information being transferred to the first server 104 from any of the other servers 104b, c; consequently, the first server 104a determines whether to trigger the alarm based on the trigger having occurred and based on the condition of the first server 104a, and not on the condition of the other servers 104b, c.

Figure 7:
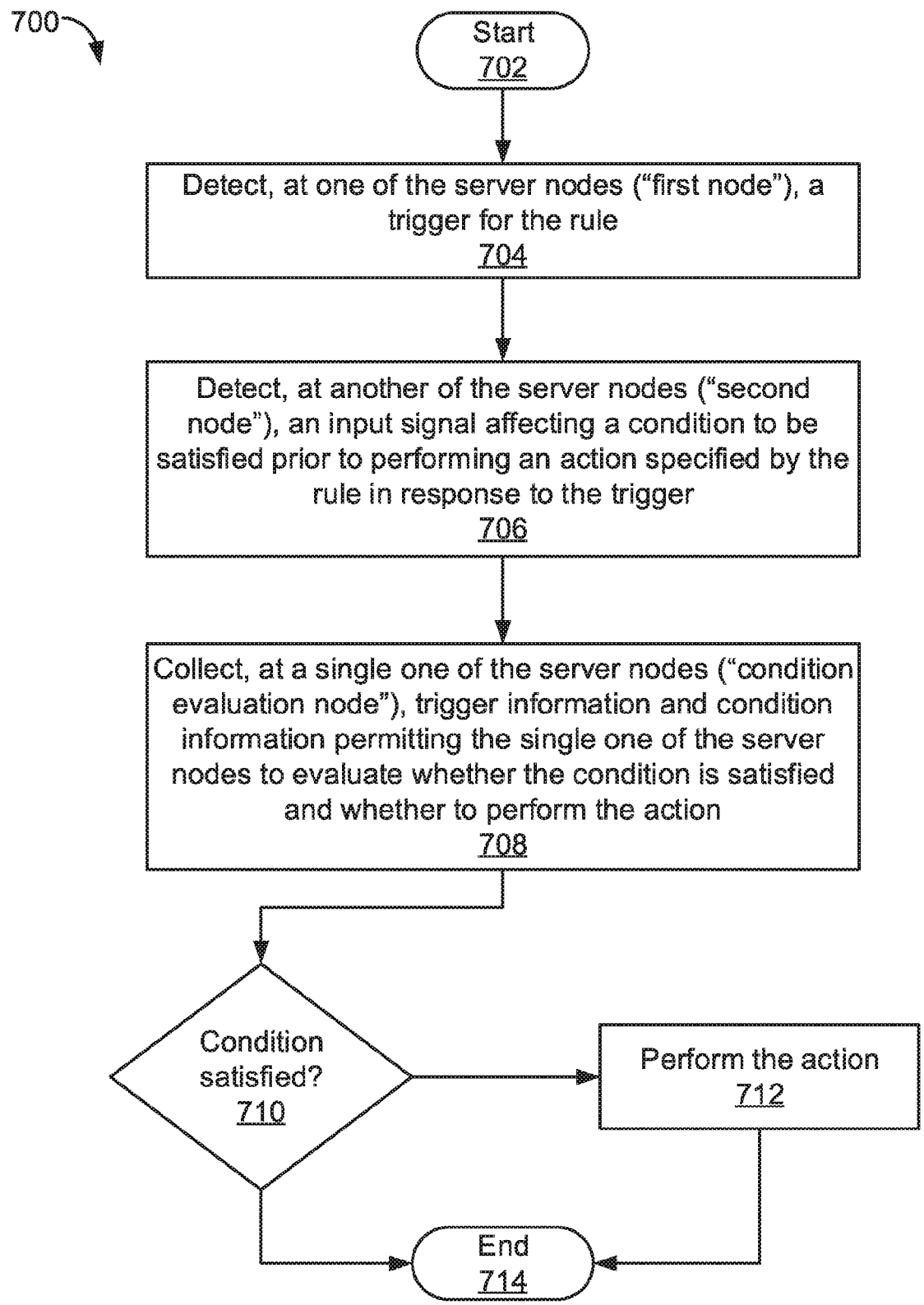
FIG. 7 is a flowchart depicting an example method for implementing a conditionally triggered rule on a physical security system having multiple server nodes, according to another embodiment.

In contrast, FIG. 7 shows a flowchart depicting an example method 700 for implementing a conditionally triggered rule using the system 100, according to another embodiment. The method 700 begins at block 702 and proceeds to block 704 where one of the server nodes 104 ("first node") detects a trigger for the rule. As discussed in further detail below, in one embodiment the trigger comprises an event and may be represented by a change in state of a binary digital signal, in which case the first node stores trigger information comprising the state change and a timestamp representing when the first node detected the trigger.

At block 706, another of the server nodes ("second node") detects an input signal affecting a condition to be satisfied prior to performing an action specified by the rule in response to the trigger. In the example embodiments below, the input signal comprises a binary digital input received by the second node from a device 501 (shown in FIG. 5) such as one of the cameras 114; for example, the camera 114 may output a digital signal representing whether the camera 114 detects motion in its field of view, with the digital signal indicative of the state of the camera 114. The second node stores condition information comprising the state change and a timestamp representing when the second node detected the state change. More generally, the input signal is generated by the device 501 in response to a change in the environment that the system 100 is monitoring.

At block 708, at least some of the trigger information and at least some of the condition information are collected at a single one of the server nodes ("condition evaluation node") to permit the condition evaluation node to evaluate whether the condition is satisfied. For example, in the example embodiments below the second node is the condition evaluation node, and the timestamp representing when the first node detected the trigger is transmitted to the second node to permit the second node to evaluate whether the condition was true at or about when the trigger occurred. The second node performs the actual evaluation of the condition at block 710. If the condition is not satisfied, the method 700 ends at block 714 and the action is not performed. If the condition is satisfied, the action is performed at block 712. In some of the example embodiments below, the second node sends a message to the first node that the condition is satisfied, and the first node then performs the action. All of the first, second, and condition evaluation nodes comprise part of the same server cluster 108.

Figure 5:
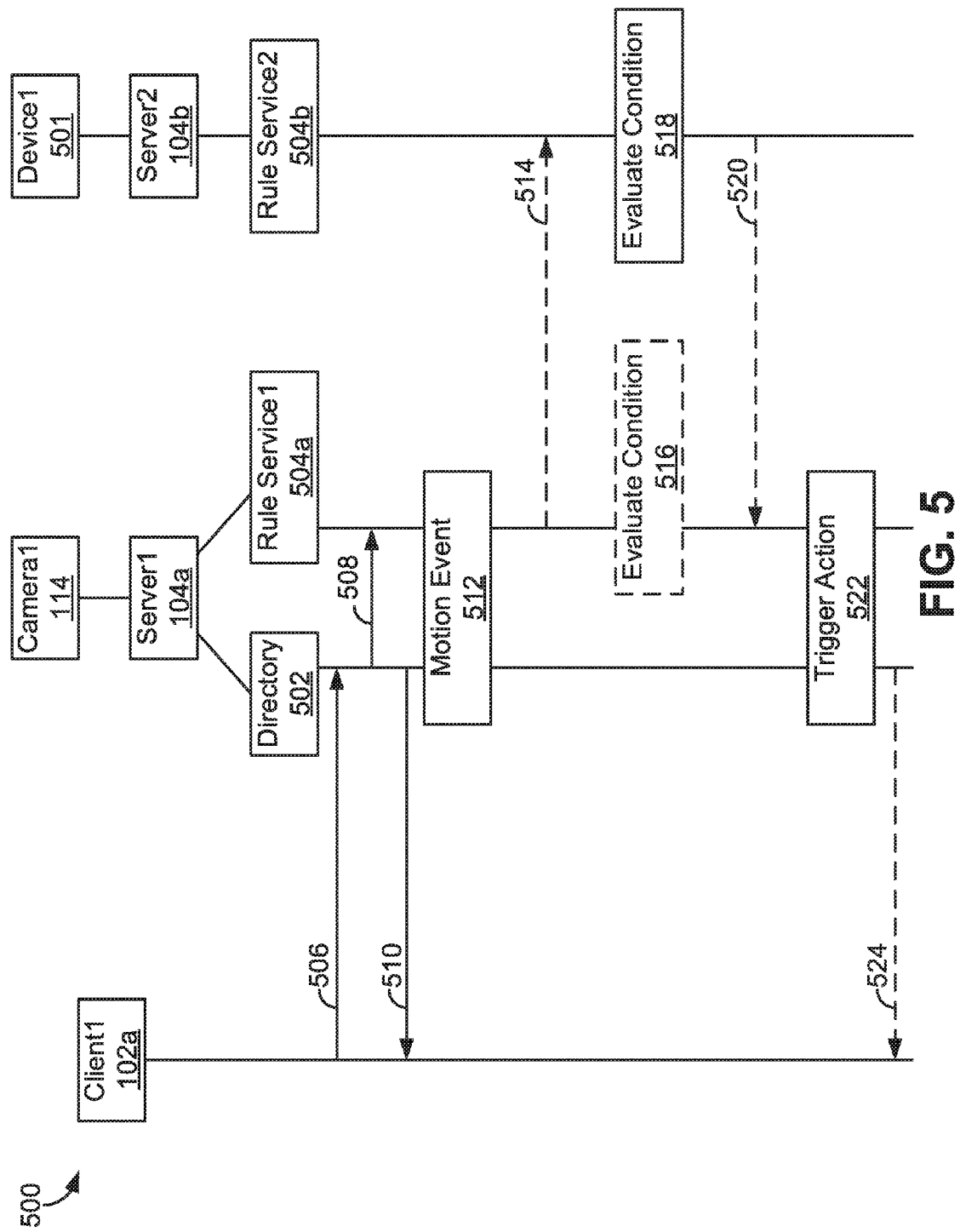
FIG. 5 is a UML sequence diagram showing how condition information is shared between different servers of the system of FIG. 1.

Referring now to FIG. 5, there is shown a UML sequence diagram 500 depicting one example application of the method 700 of FIG. 7. In FIG. 5, the first client 102a and the first and second servers 104a, b are the objects in the diagram 500. The first server 104a is communicatively coupled to one of the non-node cameras 114, which outputs a signal that acts as the trigger, while the second server 104b is communicatively coupled to a device 501 that outputs an input signal, which in the depicted embodiment is a digital signal and interchangeably referred to herein as a "digital input", to the second server 104b. The "first node" referred to in FIG. 7 is the first server 104a, and the second node 104b is both the "second node" and the "condition evaluation node" of FIG. 7. The first server 104a consequently receives condition information from the second server 104b comprising the condition of the device 501 prior to determining whether to perform an action in response to a trigger. The device 501 may comprise, for example, a door sensor that determines whether a door connected to the system 100 is opened or closed, or one of the cameras 114 that outputs a signal regarding whether it currently detects motion or not.

While in the embodiment depicted in the diagram 500 of FIG. 5 the second server 104b receives the digital input from the device 501, in different embodiments (not depicted) the signal from the device 501 to the second server 104b may be an analog signal or a mixed analog and digital signal. Furthermore, even when the digital input is a digital signal, the signal may be a binary signal or may be otherwise quantized (e.g., the signal may be hexadecimal).

The first and second servers 104a, b respectively comprise a first and a second rule service 504a, b (generally, "rule service 504"). The rule service 504 performs functions comprising the following:

(a) The rule service 504 stores in a rule store (not depicted) a list of all rules for all of the servers 104 in the system 100, and in certain embodiments only for the server 104 on which the rule service 504 is running. The rule service 504 may receive a rule update from one of the clients 102 and, additionally or alternatively, may receive the rules stored on the other servers 104 as propagated between the servers 104 using the Consistency Protocol 216.

(b) The rule service 504 detects whether a trigger has occurred on the server 104 on which the rule service 504 is running.

(c) Where the rule being performed requires evaluation of a condition based on a digital input, and the server 104 on which the rule service 504 is running also receives that digital input, the rule service 504 evaluates that condition. As discussed in further detail below in respect of the directory service 502, the rule service 504 has access to a cache of timestamped state changes of the digital input received from the device 501.

(d) Where the rule being performed requires evaluation of a condition based on a digital input, and the server 104 on which the rule service 504 is running does not receive that digital input, the rule service 504 communicates with the rule service 504 running on the server 104 that does receive the digital input in order to determine whether the condition is satisfied.

For example, in one embodiment the first server 104a may receive the trigger and the second server 104b may receive the digital input. In this example, the first server 104a communicates with the second server 104b using a server-server application programming interface ("server-server API"), as discussed in more detail below, and requests that the second server 104b evaluate the condition based on the digital input; the request is sent by the first rule service 504a and is received by the second rule service 504b. The second rule service 504b then evaluates that condition and returns the result of that evaluation to the first rule service 504a using the server-server API, following which the first rule service 504a determines whether applying the rule in view of the response from the second server 104b mandates performing an action.

The first server 104a also comprises a directory service 502 that is communicative with the first rule service 504a and the first client 102a. The directory service 502 is an application layer interface that is layered on top of many of the protocols that comprise the protocol suite 200, such as the Gossip protocol 208 and the Consistency protocol 216, to permit the first rule service 504a and the first client 102a to communicate using the protocol suite 200. The directory service also maintains the rule store on the server 104 on which the directory service is running and, by virtue of the Consistency service, learns of and includes in the rule store the rules to be evaluated by other servers 104 in the cluster 108. In different embodiments (not depicted in FIG. 5), the directory service 502 may be omitted, and applications and other services may directly interface and call on the protocols comprising the protocol suite 200 without using the directory service 502 as an intermediary.

In the depicted example embodiment, the server-server API is implemented as an RPC from the first server 104a, which is the server 104 that received the trigger but not the digital input relevant to evaluating whether the condition relevant to performance of a rule is true, to the second server 104b, which received the digital input and which can consequently evaluate the condition. Stored on each of the servers 104 is a server/digital input map, which comprises a map relating the digital inputs of the system 100 with the servers 104 that receive those digital inputs. The rule service 502 running on each of the servers 104 is communicative with the server/digital input map and accordingly has access to information identifying which of the servers 104 is connected to which of the digital inputs. As the value of any digital inputs connected to one of the servers 104 changes, the rule service 504 running on that server 104 records the nature of the change (i.e., whether the digital input transitions from low to high or high to low) and a timestamp identifying when the change occurs.

The first server 104a requests that the second server 104b evaluate the condition by sending an RPC to the second server 104b. While an RPC is used in this example embodiment, more generally any form of inter-server communication may be used to communicate between the first and second servers 104a, b. The parameters of the RPC comprise the event type, which in the depicted embodiment is whether the digital input received from the device 501 should be on or off in order to satisfy the condition, a timestamp identifying the time at which the value of the digital input is to be used to evaluate the condition, and a global identifier ("Gid") identifying the device 501 that is the source of the digital input. Typically the timestamp identifies when the first server 104a receives the trigger, although in some embodiments the timestamp may identify a different value, such as the when the trigger occurred (in embodiments in which the system 100 distinguishes between when the trigger occurs and when the first server 104a receives it), or some time before or after the trigger occurs or is received. In this example embodiment, the second server 104b receives one digital input from the device 501; consequently, the Gid identifies both the device 501 and the digital input for that device. In different embodiments in which the second server 104b receives multiple digital inputs from the device 501, the RPC may further identify the specific digital input received from the device 501.

In the depicted example embodiment, the digital inputs are binary and may come from any one or more of the devices 501 and the rule service 504 evaluates conditions in the following manner. However, in different embodiments, the rule service 504 may use different methods to evaluate conditions.

At any given time, each of the digital inputs is either on or off and the rule service 504 defines each of the conditions as follows:

{{Gids associated with digital inputs that are on}, {Gids associated with digital inputs that are off}}.

For example, in an embodiment in which the second server 104b is communicative with six different devices 501 with Gids a-f, and a condition is satisfied when the digital inputs associated with the devices 501 having Gids a-c are on for a particular timestamp while the devices 501 having Gids d-f are off for a particular timestamp, the rule service 504 defines the condition as follows:

{{a,b,c}, {d,e,f}}

The rule service 504 may store the conditions relevant for a particular server 104 in a condition store comprising part of the memory associated with that server.

Additionally or alternatively, the condition store may be accessible to one or more of the servers 104 via a network. The conditions may be stored, for example, as a text file or comprising part of a database in the format defined above.

To evaluate the condition, the rule service 504 evaluates whether the Gids associated with the digital inputs that are on and off are, in fact, on and off, respectively, at a particular timestamp. In the example above in which the devices 501 having Gids a-f, the rule service 504 expresses the evaluation of this condition as follows:

{{a,b,c}, {d,e,f}, timestamp}, which is functionally equivalent to:

{{a,b,c}, timestamp} and {d,e,f}, timestamp}.

The rule service 504 checks the event cache history for each of the devices 501 with Gids a-f and determines whether each of the digital inputs output by those devices 501 is on or off at the timestamp, and from this evaluates whether the condition is true or false. In one example embodiment, if at the timestamp for the trigger the digital input from the device 501 changes state within a tolerance period (e.g., 2 seconds), then the rule service 504 determines that the condition is true regardless of the value of the digital input at precisely the timestamp.

Once the second rule service 504b evaluates whether the condition is satisfied, it returns a response to the RPC of the first server 104a that the condition was evaluated as being true (i.e., satisfied), false (i.e., unsatisfied), or unknown. A result of "unknown" in the depicted embodiment results when the second server 104b encounters an unexpected error when attempting to evaluate the condition; in different embodiments (not depicted), the potential responses to the RPC may comprise "true" and "false" and exclude "unknown".

In certain embodiments, there may be a relatively large number of the devices 501 and servers 104, which may put processing and bandwidth strains on the system 100 when using the server-server API. For example, one example of the system 100 comprises fifty of the servers 104 and one hundred of the cameras 114 for each of the servers 104, for a total of 5,000 of the cameras 114 and accordingly 5,000 digital inputs, assuming one digital input for each of the cameras 114. In order to mitigate use of system resources, in some example embodiments the system 100 may comprise one or both of the following features:

(a) Grouped requests. Multiple requests from the first server 104a to the second server 104b to evaluate a condition may be grouped within a single RPC from the first server 104a to the second server 104b. In this way, the overhead associated with a single RPC may be shared between multiple requests. For example, in one embodiment ten requests may be grouped together in a single RPC. In some embodiments, a certain number of requests from the first server 104a to the second server 104b may be grouped together in a single RPC so long as those requests originate from the first server 104a within a certain period of time; for example, up to ten requests may be grouped and sent from the first server 104a to the second server 104b.

(b) Cap on in-flight requests. In order to limit the number of RPCs any one of the servers 104 needs to respond to at a particular time, the number of outstanding RPCs (regardless of the number of requests per RPC) may be capped at an RPC limit; in one example embodiment, the RPC limit is five RPCs that have not been responded to at any particular time for each of the servers 104. This limit may be specified in a configuration file stored on the server 104 that is receiving the RPCs. Should one of the servers 104 receive enough RPCs such that the RPC limit for that server 104 is exceeded, that server 104 may respond to RPCs exceeding the RPC limit with a "false" or "unknown" response.

In FIG. 5, the first client 102a creates a rule (message 506) that results in performance of an action in response to a trigger when a condition is satisfied. In the example of FIG. 5, the rule results in an alarm being displayed (the action), as shown in FIG. 6, in response to motion being detected by the camera 114 (the trigger) so long as a door is open when the motion is detected (the condition). The door in this example is the device 501. While in FIG. 5 a single one of the cameras 114 and a single one of the devices 501 are connected to the first server 104a and the second server 104b, respectively, in different embodiments (not depicted) one or both of the first and second servers 104a, b may be connected to multiple pieces of equipment.

Following communication with the first client 102a, the directory service 502 on the first server 104a communicates the newly created rule to the first rule service 504a (message 508), which stores the rule in the rule store. The directory service 502 then confirms to the first client 102a that the rule has been successfully created and saved by the first server 104a (message 510).

At some time after creation and saving of the rule in the rule store, the rule service 504a detects the trigger (frame 512), which in FIG. 5 is a notification from the camera 114 that motion has been detected. For example, the camera 114 may be directed at the interior of a bank vault during non-working hours, where motion is not expected to be detected. In one example embodiment in which the first rule service 504a requires information about the state of the door, the first rule service 504a communicates to the second rule service 504b (message 514) and requests that the second rule service 504b evaluate whether the door was open at the time the camera 114 detected motion using the server-server API, described above. The second rule service 504b evaluates the condition by determining whether the digital input associated with the door is in the state corresponding to an open door at the timestamp corresponding to when the camera 114 detected motion; for example, if the digital input from the door is on when the door is open, the second rule service 504b returns "true" to the first rule service 504a if the digital input is on when the camera 114 detected motion and otherwise returns "false" or "unknown" (message 520). The first rule service 504a accordingly displays an alarm (frame 522) if the message 520 is "true" and otherwise takes no action. The first rule service 504a also updates the first client 102a, such as by updating the view of the first client 102a to display the screen of FIG. 6, as desired.

Alternatively, if the device 501 in the form of the door and the camera 114 are both connected to the first server 104a and there is consequently no need for communication between the servers 104a, b to evaluate the condition, the first rule service 504a evaluates the condition itself (frame 516) with sending and receiving the messages 514, 520 to and from the second rule service 504b. In this example, after evaluating the condition the first rule service 504a may display the alarm at frame 522 if the condition is evaluated as "true".

In the embodiment of FIG. 5, trigger information comprising the timestamp representing when the first server 104a receives the trigger is sent from the first server 104a to the second server 104b to permit the second server 104b to evaluate the condition, and condition information in the form of the result of the evaluation of the condition by the second server 104b is sent from the second server 104b to the first server 104a to permit the first server 104a to evaluate the rule. In different embodiments (not depicted), the content of the communication between the servers 104a, b may be different. For example, in one different embodiment the digital input itself may be transferred using the rule services 504a, b from the second server 104b to the first server 104a to allow the first server 104a to evaluate the condition itself, in which case one or both of the digital input and a timestamp for that digital input may comprise the condition information that is transferred to the first server 104a. In another example embodiment, trigger information may be transferred using the rule services 504a, b from the first server 104a to the second server 104b to allow the second server 104b to evaluate the rule and perform an action, if the rule so specifies. And in another example embodiment, the rule services 504a, b may transfer the trigger and condition information from the first and second servers 104a, b, respectively, to another of the servers 104 to allow that other server 104 to evaluate the condition and the rule and to consequently perform an action, if the rule so specifies.

In another example embodiment, the condition information may be pushed to a master server (not depicted) that is used to evaluate all conditions, and the other servers 104 in the system 100 may communicate with that master server using the server-server API to evaluate the conditions of digital inputs received by any other of the servers 104 in the system 100. In an embodiment of the system 100 comprising the master server, the master server is the "condition evaluation node" referred to in FIG. 7. In the event the master server fails and can no longer act as the condition evaluation node for the system 100, the system 100 automatically elects another of the servers 104 to act as the master server. In one embodiment, each of the servers 104 also stores a boolean variable indicating whether it is or is not the master server. The servers 104 that are not the master server therefore know to communicate with the master server using the server-server API in order to evaluate a condition, while the master server identifies itself as the condition evaluation node and evaluates conditions itself without communicating with any other of the servers 104.

While certain example embodiments are depicted, alternative embodiments, which are not depicted, are possible. For example, in FIG. 5 the first server 104a evaluates the rule and performs the action when the condition is satisfied. In a different embodiment, another of the server nodes (a "rule evaluation node") may receive one or both of trigger and condition information from any one or more of the first server 104a, the second server 104b, and the condition evaluation node to permit the rule evaluation node to evaluate the rule and, optionally, perform the action. In another alternative embodiment, the rule evaluation node may evaluate the rule and, if the rule specifies that an action is to be performed, the rule evaluation node may communicate with another of the servers 104 to cause that other of the servers 104 to perform the action.

As another example, while in the depicted embodiment the node cameras 106 and non-node cameras 114 are distinct from each other, in alternative embodiments (not depicted) a single camera may be simultaneously a node camera and a non-node camera. For example, in FIG. 1 the first camera 106a is a node that is a member of the third cluster 108c; however, if the first camera 106a were also directly coupled to the fifth server 104e but retained only its cluster membership information for the third cluster 108c, the first camera 106a would remain a member of the third cluster 108c while simultaneously acting as a non-node camera 114 from the perspective of the fifth server 104e.

The processor used in the foregoing embodiments may be, for example, a microprocessor, microcontroller, programmable logic controller, field programmable gate array, or an application-specific integrated circuit. Examples of computer readable media are non-transitory and include disc-based media such as CD-ROMs and DVDs, magnetic media such as hard drives and other forms of magnetic disk storage, semiconductor based media such as flash media, random access memory, and read only memory.

It is contemplated that any part of any aspect or embodiment discussed in this specification can be implemented or combined with any part of any other aspect or embodiment discussed in this specification.

For the sake of convenience, the example embodiments above are described as various interconnected functional blocks. This is not necessary, however, and there may be cases where these functional blocks are equivalently aggregated into a single logic device, program or operation with unclear boundaries. In any event, the functional blocks can be implemented by themselves, or in combination with other pieces of hardware or software.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A method for implementing a conditionally triggered rule on a physical security system having a plurality of server nodes, the method comprising:
    (a) detecting, at one of the server nodes ("first node"), a trigger for the rule;
    (b) detecting, at another of the server nodes ("second node"), an input signal affecting a condition to be satisfied prior to performing an action specified by the rule in response to the trigger;
    (c) sending an inter-server communication, from the first node to the second node, comprising more than one request within a period of time that the second node evaluate the condition, the inter-server communication comprising all requests generated by the first node for the second node within the period of time;
    (d) collecting, at the second node, trigger information from the first node and condition information permitting the second node to evaluate whether the condition is satisfied;
    (e) evaluating, at the second node, whether the condition is satisfied; and
    (f) when the condition is satisfied, performing the action,
    wherein each of the first node and the second node comprises at least part of a server cluster and is identified by a node identifier,
    wherein the node identifier for each of the first node and the second node, comprises at least part of cluster membership information identifying all and accessible by all of the servers in the server cluster.

2. The method of claim 1 wherein the cluster membership information is persistently stored on each of the first node and the second node.

3. The method of claim 1 further comprising sending, from the second node to the first node, a message regarding whether the condition is satisfied, and wherein the first node performs the action when the condition is satisfied.

4. The method of claim 3 wherein a device is communicatively coupled to the second node and the second node receives a binary digital input from the device that represents a state of the device, and wherein evaluating whether the condition is satisfied comprises evaluating whether the digital input is on or off at a particular time.

5. The method of claim 4 wherein additional devices are communicatively coupled to the second node and the second node receives from each of the additional devices a binary digital input that represents a state of the additional device from which the digital input originates, and wherein evaluating whether the condition is satisfied comprises evaluating whether at least two of the digital inputs are on or off at a particular time.

6. The method of claim 4 wherein the particular time is when the trigger is detected at the first node.

7. The method of claim 1 wherein collecting the trigger information and the condition information at the second node comprises part of sending the inter-server communication.

8. The method of claim 1 wherein the request comprises an indication of whether the input signal is high or low, a timestamp, and an identifier of the device that generates the input signal.

9. The method of claim 1 wherein the inter-server communication comprises a single remote procedure call.

10. The method of claim 1 further comprising:
    (a) determining how many inter-server communications, each comprising a request that the second server evaluate a condition, that the second server is receiving from the server nodes; and
    (b) when the second server is receiving more than a maximum permitted number of inter-server communications, refusing to fulfill the request of each of the inter-server communications exceeding the maximum permitted number.

11. The method of claim 1 wherein the second node is a master server distinct from the first node.

12. A physical security system configured to implement the method of claim 1.

13. A non-transitory computer readable medium having encoded thereon computer program code that, when executed, causes a processor to perform the method of claim 1.

14. A physical security system, comprising a first server node ("first node") and a second server node ("second node"), wherein:
    (a) the first node is configured to:
        (i) detect a trigger for a conditionally triggered rule;
        (ii) send an inter-server communication to the second node, comprising more than one request within a period of time that the second node evaluate the condition to be satisfied prior to performing an action specified by the rule in response to the trigger, the inter-server communication comprising all requests generated by the first node for the second node within the period of time; and
(iii) when the trigger has occurred and the first node has received a response to the request from the second node that the condition is satisfied, performing the action; and
(b) the second node is configured to:
detect a digital input affecting a condition to be satisfied prior to performing an action specified by the rule in response to the trigger;
(ii) evaluate whether the condition is satisfied in response to the request from the first node; and
(iii) send the response to the first node, when the condition is satisfied,
wherein each of the first node and the second node comprises at least part of a server cluster and is identified by a node identifier,
wherein the node identifier for each of the first node and the second node comprises at least part of cluster membership information identifying all and accessible by all of the servers in the server cluster.

15. A method for implementing a conditionally triggered rule on a physical security system having a plurality of server nodes, the method comprising:
(a) detecting, at one of the server nodes ("first node"), a trigger for the rule;
(b) detecting, at another of the server nodes ("second node"), an input signal affecting a condition to be satisfied prior to performing an action specified by the rule in response to the trigger;
(c) sending an inter-server communication, from the first node to the second node, comprising more than one request within a period of time that the second node evaluate whether the condition is satisfied, the inter-server communication comprising all requests generated by the first node for the second node within the period of time;
(d) evaluating, at the second node, whether the condition is satisfied;
(e) sending a response indicating the condition is satisfied from the second node to the first node when the condition is satisfied; and
(f) when the condition is satisfied, performing the action at the first node,
wherein each of the first node and the second node comprises at least part of a server cluster and is identified by a node identifier,
wherein the node identifier for each of the first node and the second node, comprises at least part of cluster membership information identifying all and accessible by all of the servers in the server cluster.

16. A method for implementing a conditionally triggered rule on a physical security system having a plurality of server nodes, the method comprising:
(a) detecting, at one of the server nodes ("first node"), a trigger for the rule;
(b) detecting, at another of the server nodes ("second node"), an input signal affecting a condition to be satisfied prior to performing an action specified by the rule in response to the trigger;
(c) sending a request from the first node to a single one of the server nodes ("rule evaluation node") to evaluate the rule;
(d) sending an inter-server communication, from the first node to the second node, comprising more than one request within a period of time that the second node evaluate whether the condition is satisfied, the inter-server communication comprising all requests generated by the first node for the second node within the period of time;
(e) evaluating, at the second node, whether the condition is satisfied;
sending a response indicating the condition is satisfied from the second node to the rule evaluation node when the condition is satisfied; and
(g) when the condition is satisfied, performing the action,
wherein each of the first node, the second node, and the rule evaluation node comprises at least part of a server cluster and is identified by a node identifier,
wherein the node identifier for each of the first node, the second node, and the rule evaluation node comprises at least part of cluster membership information identifying all and accessible by all of the servers in the server cluster.

* * * * *